United States Patent [19]

Umehara

[11] Patent Number: 5,581,422
[45] Date of Patent: *Dec. 3, 1996

[54] ACTUATOR WITH MOVEABLE COIL AND RECORDING APPARATUS

[75] Inventor: Teruo Umehara, Hanyu, Japan

[73] Assignee: Hitachi Metals, Ltd., Tokyo, Japan

[*] Notice: The term of this patent shall not extend beyond the expiration date of Pat. No. 5,459,359.

[21] Appl. No.: 407,247

[22] Filed: Mar. 20, 1995

Related U.S. Application Data

[63] Continuation of Ser. No. 194,099, Feb. 8, 1994, abandoned.

[30] Foreign Application Priority Data

| Feb. 9, 1993 | [JP] | Japan | 5-021032 |
| Feb. 9, 1993 | [JP] | Japan | 5-021035 |
| Feb. 9, 1993 | [JP] | Japan | 5-021036 |
| Feb. 24, 1993 | [JP] | Japan | 5-033817 |

[51] Int. Cl.$^6$ ............................. G11B 5/54; H02K 41/02
[52] U.S. Cl. ...................... 360/97.01; 360/105; 360/106; 310/13
[58] Field of Search ..................... 360/97.01, 97.02, 360/97.03, 97.04, 105, 106; 264/263, 271.1, 272.2; 310/13

[56] References Cited

U.S. PATENT DOCUMENTS

| Re. 32,075 | 1/1986 | Harrison et al. ........................ 360/77 |
| 4,150,407 | 4/1979 | Dijkstra ............................... 360/106 |

(List continued on next page.)

FOREIGN PATENT DOCUMENTS

| 0467556 | 1/1992 | European Pat. Off. .............. 360/106 |
| 2952095 | 7/1980 | Germany ............................. 310/43 |
| 55-67975 | 5/1980 | Japan . |
| 56-19561 | 2/1981 | Japan . |
| 58-57721 | 4/1983 | Japan . |
| 59-124066 | 7/1984 | Japan . |
| 60-159566 | 8/1985 | Japan . |
| 63-142574 | 6/1988 | Japan . |
| 64-89946 | 4/1989 | Japan . |
| 1-96752 | 6/1989 | Japan . |
| 2-310865 | 12/1990 | Japan . |
| 3-86778 | 9/1991 | Japan . |
| 4-114373 | 4/1992 | Japan . |

OTHER PUBLICATIONS

English Abstract of Japanese Patent Laid–Open No. 55–67975, dated May 22, 1980.
English Abstract of Japanese Patent Laid–Open No. 56–19561, dated Feb. 2, 1981.
English Abstract of Japanese Patent Laid–Open No. 58–57721, dated Apr. 6, 1983.
English Abstract of Japanese Patent Laid–Open No. 59–124066, dated Jul. 18, 1984.
English Abstract of Japanese Patent Laid–Open No. 63–142574, dated Jun. 14, 1988.
English Abstract of Japanese Patent Laid–Open No. 1–89946, dated Apr. 5, 1989.
English Abstract of Japanese Patent Laid–Open No. 2–310865, dated Dec. 26, 1990.

*Primary Examiner*—Robert S. Tupper
*Assistant Examiner*—William J. Klimowicz
*Attorney, Agent, or Firm*—Finnegan, Henderson, Farrabow, Garrett & Dunner

[57] ABSTRACT

A movable coil-type actuator including (a) a permanent magnet assembly constituted by a flat permanent magnet and a lower yoke element made of ferromagnetic material, the permanent magnet assembly including a recess in a central portion; (b) an upper yoke element made of a ferromagnetic material, the upper yoke element having such a shape that an edge of the permanent magnet does not extend from a periphery of the upper yoke element when viewed from above; (c) a unitary base member made of a thermoplastic resin and integrally including a hold portion for receiving the permanent magnet assembly and support portions for supporting the upper yoke element, a magnetic gap being defined by the permanent magnet and the upper yoke element; and (d) a movable coil fixed to an end of a swingable arm and movable in the magnetic gap.

3 Claims, 12 Drawing Sheets

U.S. PATENT DOCUMENTS

| | | | |
|---|---|---|---|
| 4,196,456 | 4/1980 | Manzke et al. | 360/106 |
| 4,369,959 | 8/1983 | Harrison et al. | 360/77 |
| 4,490,635 | 12/1984 | Harrison et al. | 310/38 |
| 4,516,177 | 5/1985 | Moon et al. | 360/77 |
| 4,544,973 | 10/1985 | Van De Bult | 360/106 |
| 4,553,058 | 11/1985 | Iwasaki | 310/268 |
| 4,638,281 | 1/1987 | Baermann | 335/303 |
| 4,639,624 | 1/1987 | Ejiri et al. | 310/154 |
| 4,639,798 | 1/1987 | Harrison et al. | 360/73 |
| 4,639,863 | 1/1987 | Harrison et al. | 364/200 |
| 4,669,004 | 5/1987 | Moon et al. | 360/77 |
| 4,755,709 | 7/1988 | De Jager | 310/90.5 |
| 4,772,974 | 9/1988 | Moon et al. | 360/98 |
| 4,849,840 | 7/1989 | Fujioka | 360/104 |
| 4,855,853 | 8/1989 | Matsushita et al. | 360/106 |
| 4,879,617 | 11/1989 | Sampietro et al. | 360/106 |
| 4,949,194 | 8/1990 | MacPherson et al. | 360/104 |
| 4,951,023 | 8/1990 | Erd et al. | 355/222 |
| 4,985,652 | 1/1991 | Oudet et al. | 310/15 |
| 5,005,089 | 4/1991 | Thanos et al. | 360/77.08 |
| 5,005,095 | 4/1991 | Wagner | 360/106 |
| 5,027,241 | 6/1991 | Hatch et al. | 360/105 |
| 5,034,837 | 7/1991 | Schmitz | 360/105 |
| 5,077,624 | 12/1991 | Nakanishi | 360/85 |
| 5,119,254 | 6/1992 | Brown et al. | 360/106 |
| 5,122,703 | 6/1992 | Takahashi et al. | 310/36 |
| 5,140,210 | 8/1992 | Shirakawa | 310/156 |
| 5,148,071 | 9/1992 | Takahashi | 310/208 |
| 5,165,090 | 11/1992 | Takahashi et al. | 369/215 |
| 5,168,184 | 12/1992 | Umehara et al. | 310/13 |
| 5,168,185 | 12/1992 | Umehara et al. | 310/15 |
| 5,223,993 | 6/1993 | Squires et al. | 360/77.08 |
| 5,225,725 | 7/1993 | Shiraki et al. | 310/12 |
| 5,227,936 | 7/1993 | Strickler et al. | 360/97.02 |
| 5,305,169 | 4/1994 | Anderson et al. | 360/105 |
| 5,363,260 | 11/1994 | Kawakami | 360/97.01 |
| 5,459,359 | 10/1995 | Umehara | 310/13 |

FIG. 12 (a) PRIOR ART
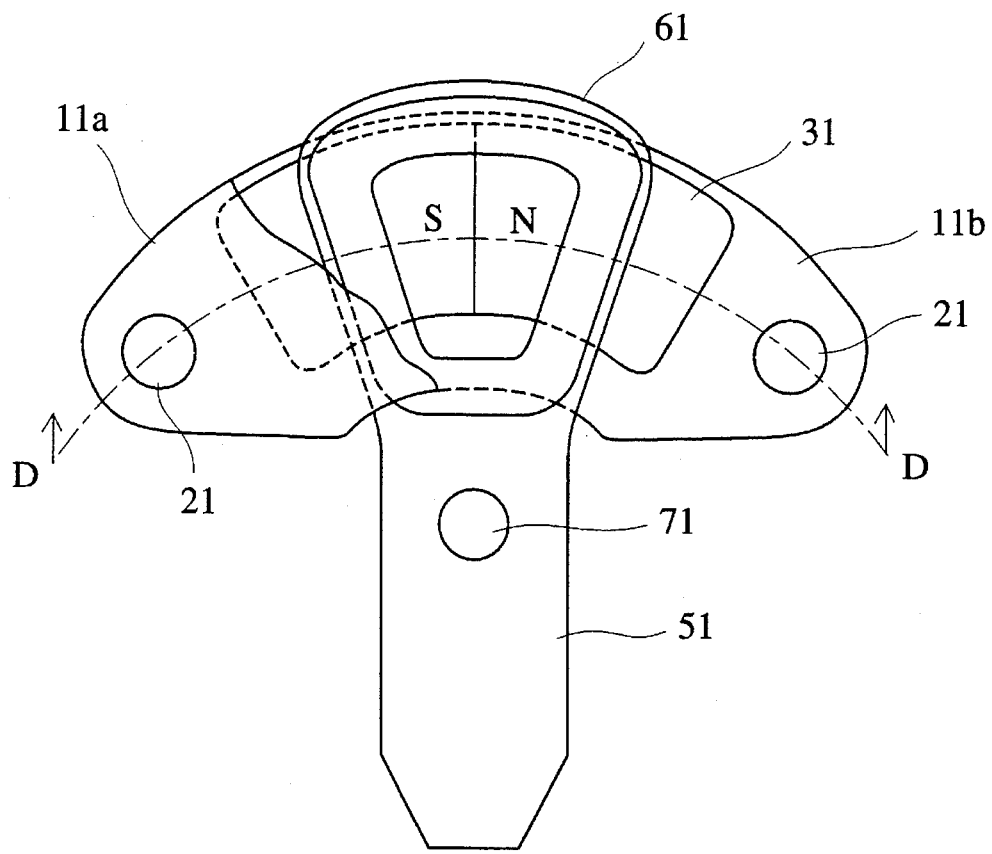
FIG. 12 (b) PRIOR ART
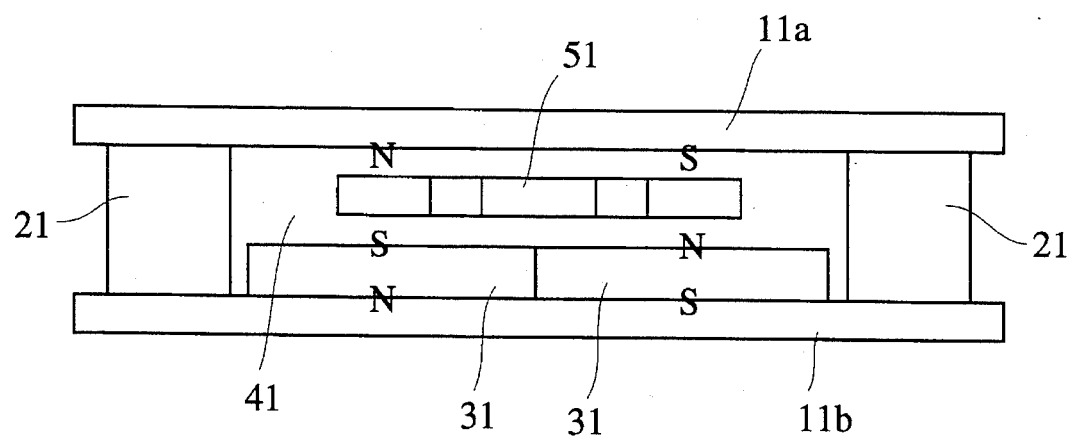

ACTUATOR WITH MOVEABLE COIL AND RECORDING APPARATUS

This application is a continuation of application Ser. No. 08/194,099, filed Feb. 8, 1994, now abandoned.

BACKGROUND OF THE INVENTION

The present invention relates to a movable coil-type actuator for moving a function member such as a magnetic head in a magnetic disk drive and an optical head in a CD or LD drive or a magneto-optical disk drive, along a circular or straight path, and a recording apparatus comprising such a movable coil-type actuator.

One of conventional movable coil-type actuators is shown in FIGS. 9 to 11. FIG. 9 is a partly cross-sectional front elevation, FIG. 10 is a cross-sectional view taken along the line C—C in FIG. 9, and FIG. 11 is an exploded perspective view. A base yoke element 1, a center yoke element 2 and side yoke elements 3, 3 are rectangular plates made of a ferromagnetic material such as soft iron and are joined by bolts or other fixing means (not shown) to make up an E-shaped yoke.

A short ring 4 is a hollow, rectangular-tubular member made of an electrically conductive material such as copper, which encloses the center yoke element 2. Permanent magnets 5, 5 each in the form of a rectangular plate magnetized in its thickness direction are fixed to inner surfaces of the side yoke elements 3, 3, respectively, with the same magnetic pole opposing the center yoke 2. An arm 7 supports a hollow rectangular-cylindrical coil (movable coil) 6 at one end and a function member such as a magnetic head (not shown) at the other end. The arm 7 is pivotally or swingably supported by a shaft 9 to locate the movable coil 6 in a magnetic gap 8 between the permanent magnets 5, 5 so that the arm 7 moves in the magnetic gap 8 along surfaces of the permanent magnets 5, 5. A counter yoke element 10 is a flat, rectangular member made of the same material as that of the elements 1, 2, 3 constituting the E-shaped yoke, and secured to the open end of the E-shaped yoke by screws or other fixing means (not shown).

When a signal current is supplied to the movable coil 6, a magnetic force acts on the movable coil 6 according to the Fleming's left hand rule and makes the arm 7 pivot or swing about the shaft 9. As a result, a function member such as a magnetic head supported at the other end of the arm 7 is brought to a desired recording track on a magnetic disk. The swinging direction of the arm 7 is changed by inverting the direction of a signal current applied to the movable coil 6.

The actuator shown in FIGS. 9 and 10 has been fabricated by forming individual yoke elements 1 to 3, joining them together into an E-shaped yoke as shown in FIG. 11 by appropriate fixing means, and then bonding the permanent magnets 5, 5 to inner surfaces of the side yoke elements 3, 3 by an adhesive. Such an adhesive, however, must be set typically by heating, which needs additional time and steps and hence increases a manufacturing cost of the actuator. In addition, gas generated from the adhesive during the heating process invites an environmental problem.

Another conventional movable coil-type actuator is shown in FIGS. 12(a), 12(b), 13 and 14. FIG. 12(a) is a partly broken plan view, FIG. 12(b) is an elevational view taken from the line D—D in FIG. 12(a), FIG. 13 is a perspective view, and FIG. 14 is an exploded perspective view. Plate-shaped yoke elements 11a, 11b are made of a ferromagnetic material such as soft iron and opposing each other via supports 21, 21 which connect their end portions. A trapezoidal plate-shaped permanent magnet 31 (or a combination of two magnets) magnetized in the thickness direction thereof is fixed to an upper surface of a lower yoke element 11b such that N and S magnetic poles appear in a magnet surface exposed to a magnetic gap 41 defined between the upper yoke element 11a and the permanent magnet 31.

An arm 51 supports a flat movable coil 61 at one end and a function member such as a magnetic head (not shown) at the other end. The arm 51 is pivotally or swingably supported by a shaft 71 to locate and move the movable coil 61 in the magnetic gap 41 defined by the upper yoke element 11a and the permanent magnet 31.

The lower yoke element 11b is provided with stoppers 81, 81 projecting therefrom for engaging the arm 51 to prevent its undesired movement when the arm 51 should rest. The lower yoke element 11b is also provided with stopper pins 81a, 81a projecting therefrom near opposite ends of the permanent magnet 31 to regulate the swing span of the flat movable coil 61 (omitted in FIGS. 12(b) and 13). Positioning pins 91 projecting from the lower yoke element 11b are brought into contact with a periphery of the permanent magnet 31 to hold it in place.

When a signal current is supplied to the flat movable coil 61, the magnetic head supported at the other end of the arm 51 is brought to a desired recording track on a magnetic disk in the same manner as in the actuator shown in FIGS. 9 to 11.

The actuator shown in FIGS. 12(a) through 14 is fabricated by forming individual elements, fixing the positioning pins 91 to the lower yoke element 11b at proper positions as shown in FIG. 14, and then bonding the permanent magnet 31 to the lower yoke element 11b by an adhesive. This actuator, therefore, suffers from the same adhesive-related problem as mentioned with reference to the actuator shown in FIGS. 9 to 11.

Still referring to FIGS. 12(a) to 14, after the permanent magnet 31 is bonded to the lower yoke element 11b, this conventional actuator needs subsequent steps of fixing the supports 21, 21 and the stoppers 81, 81 to the lower yoke element 11b, fixing the upper yoke element 11a to the supports 21, 21 by screws 21a, 21a. Since the fixing of these elements and members requires screws or caulking, the assembling process needs much manual labor, taking much time and many steps and resulting in a high production cost.

With respect to the actuator shown in FIGS. 12(a) to 14, there have been made several proposals to maximize the uniformity of the magnetic density distribution in the magnetic gap 41. For instance, a notch may be provided in a periphery of the permanent magnet 31 at a center position thereof (see, for example, Japanese Utility Model Laid-Open No. 3-86778). However, when the permanent magnet 31 is provided with a notch, a complicated casting die is needed, and it is likely to cause a defective molding.

Alternatively, the thickness of a central portion of the permanent magnet 31 may be changed to increase the dimension of the magnetic gap 41 (see, for example, Japanese Patent Laid-Open No. 4-114373). However, when the thickness of the permanent magnet is changed, mechanical working of the permanent magnet 31 originally having a uniform thickness is needed, increasing a production cost.

Further, one of the yoke elements 11a, 11b opposing the permanent magnet 31 may be made to have such a configuration that the dimension of the magnetic gap 41 diminishes from the center toward the end of the permanent magnet 31

(see, for example, Japanese Patent Laid-Open No. 64-77455). However, when the yoke element is provided with a special shape, an additional working cost is needed.

Considering an increasingly higher demand of making movable coil-type actuators thinner and less expensive, the actuators shown in FIGS. 9 to 11 and FIGS. 12(a) to 14 are unsatisfactory because they need many parts and a high assembling cost.

With respect to a magnetic disk drive, FIGS. 15–17 show a conventional one. FIG. 15 is a partly cut-away plan view, FIG. 16 is a partial cross-sectional view, and FIG. 17 is an exploded perspective view. The magnetic disk drive comprises a rectangular casing 210 and a cover 222 both made of a non-magnetic material such as an aluminum alloy. Disposed in the casing 210 is a driving motor (not shown) having a spindle 223 to which a plurality of magnetic disks 224 are fixed with a certain interval. A swingable arm 205 has a flat movable coil 206 at one end and a magnetic head 226 at the other end, and is swingable about a shaft 207 fixed to the casing 210. The flat movable coil 206 is positioned in a magnetic circuit formed by a permanent magnet 31 and a pair of yokes 211a, 211b, and the magnetic head 226 is positioned on a magnetic track of each magnetic disk 224.

A magnetic circuit-forming means comprises an upper yoke element 211a and a lower yoke element 211b both made of a ferromagnetic material such as soft iron and opposing each other via supports 221, 221 which connect their end portions. A permanent magnet 31 in a substantially trapezoidal flat shape and magnetized in the thickness direction thereof is fixed to an upper surface of a lower yoke element 211b such that N and S magnetic poles appear in a magnet surface exposed to a magnetic gap 204 defined between the upper yoke element 211a and the permanent magnet 31. The flat movable coil 206 is movable back and forth in the magnetic gap 204 and its swinging direction can be changed by inverting the direction of a signal current applied to the flat movable coil 206.

When a signal current is supplied to the flat movable coil 206, a magnetic force acts on the movable coil 206 according to the Fleming's left hand rule and makes the arm 205 pivot or swing about the shaft 207. As a result, the magnetic head 226 supported at the other end of the arm 205 is brought to a desired recording track on the magnetic disk 224.

FIG. 17 is an exploded perspective view of the magnetic circuit-forming means (movable coil-type actuator) contained in the above magnetic disk drive. The lower yoke element 211b is provided with positioning pins 209 which are brought into contact with a periphery of the permanent magnet 31 for holding it at a proper position.

To form the above magnetic circuit-forming means, individual elements are joined together, and the permanent magnet 31 is positioned by the positioning pins 209 and bonded to an upper surface of the lower yoke element 211b by an adhesive. The use of an adhesive, however, causes the same problems as discussed above.

Since the fixing of the permanent magnet 31 to the lower yoke element 211b with the supports 221, 221 requires screws or caulking, the assembling process needs much manual labor, taking much time and many steps and resulting in a high production cost, failing to meet the recent demand of making the magnetic disk drive thinner and less expensive.

OBJECT AND SUMMARY OF THE INVENTION

Accordingly, an object of the present invention is to provide a movable coil-type actuator which has overcome the problems involved in the conventional actuators by using a smaller number of elements which contributes to easier assembling and a much lower manufacturing cost while realizing a higher performance.

Another object of the present invention is to provide a recording apparatus comprising such a movable coil-type actuator.

In a first aspect of the present invention, a movable coil-type actuator comprises:

(a) an E-shaped yoke made of a ferromagnetic material and including a center yoke element, a pair of side yoke elements and a base yoke element connecting the center yoke element and the side yoke elements;

(b) at least one permanent magnet fixed to an inner surface of at least one of the side yoke elements such that the same magnetic pole opposes the center yoke; and (c) a movable coil fixed to a swingable arm, the movable coil being disposed in a magnetic gap between the permanent magnet and the center yoke element and movable along a surface of the permanent magnet, the yoke elements being integrally enclosed by an injection-molded thermoplastic resin.

In a second aspect of the present invention, a movable coil-type actuator comprises:

(a) a permanent magnet assembly constituted by a flat permanent magnet magnetized in its thickness direction and a lower yoke element made of ferromagnetic material attached to the permanent magnet, the permanent magnet assembly including in a central portion a space defined by a recess provided in the permanent magnet and/or the lower yoke element;

(b) an upper yoke element made of a ferromagnetic material, the upper yoke element having such a shape that an edge of the permanent magnet does not extend from a periphery of the upper yoke element when viewed from above;

(c) a unitary base member made of a thermoplastic resin and including a hold portion integrally projecting from an upper surface of the base member for receiving the permanent magnet assembly, and support portions integrally projecting from an upper surface of the base member near both ends of the hold portion for supporting the upper yoke element, a magnetic gap being defined by the permanent magnet and the upper yoke element; and (d) a movable coil fixed to an end of a swingable arm, the movable coil being movable in the magnetic gap along a surface of the permanent magnet.

In a third aspect of the present invention, a movable coil-type actuator comprises:

(a) a permanent magnet assembly constituted by a flat permanent magnet magnetized in its thickness direction and a lower yoke element made of ferromagnetic material attached to the permanent magnet;

(b) an upper yoke element made of a ferromagnetic material, the upper yoke element having such a shape that an edge of the permanent magnet does not extend from a periphery of the upper yoke element when viewed from above;

(c) a unitary base member made of a thermoplastic resin and including a hold portion integrally projecting from an upper surface of the base member for receiving the permanent magnet assembly, stopper portions integrally projecting from the hold portion substantially at both ends thereof, and support portions integrally projecting from an upper surface of the base member near both ends of the hold portion for supporting the upper yoke element, a magnetic gap being defined by the permanent magnet and the upper yoke element;

(d) stopper rings made of an elastic material and attached to the stopper portions; and (e) a movable coil fixed to an end of a swingable arm, the movable coil being movable in the magnetic gap along a surface of the permanent magnet.

In a fourth aspect of the present invention, a recording apparatus comprising:

(a) a permanent magnet assembly constituted by a flat permanent magnet magnetized in its thickness direction and a lower yoke element made of ferromagnetic material attached to the permanent magnet;

(b) an upper yoke element made of a ferromagnetic material, the upper yoke element having such a shape that an edge of the permanent magnet does not extend from a periphery of the upper yoke element when viewed from above;

(c) a casing made of a thermoplastic resin and including a hold portion integrally projecting from a bottom surface of the casing for receiving the permanent magnet assembly and support portions integrally projecting from a bottom surface of the casing near both ends of the hold portion for supporting the upper yoke element, a magnetic gap being defined by the permanent magnet and the upper yoke element;

(d) a recording medium rotatable by a motor supported by the casing; and (e) a swingable arm having a movable coil at an end thereof, the movable coil being movable in the magnetic gap along a surface of the permanent magnet.

BRIEF DESCRIPTION OF THE DRAWINGS

FIG. 12($a$) is a partly broken plan view of another conventional movable coil-type actuator;

FIG. 12($b$) is a cross-sectional view taken along the line D—D in FIG. 12($a$);

DETAILED DESCRIPTION OF THE PREFERRED EMBODIMENTS

[1] First Embodiment

Figure 1:
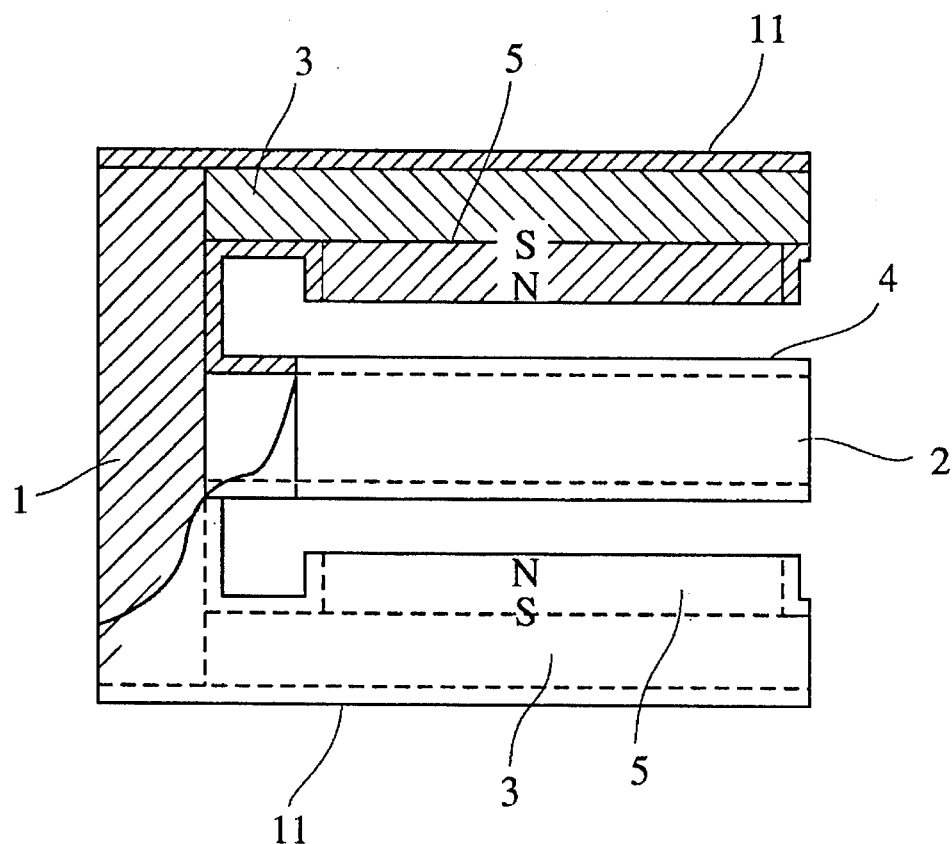
FIG. 1 is a partly broken cross-sectional view of a movable coil-type actuator according to a first embodiment of the present invention.

An actuator with a movable coil simply called "movable coil-type actuator" is shown in the first embodiment in FIG. 1. The movable coil-type actuator includes a base yoke element 1, a center yoke element 2, side yoke elements 3, 3, permanent magnets 5, 5 and a hold member 11 made of a thermoplastic resin, which may contain glass fibers. The hold member 11 integrally encloses the base yoke element 1, the center yoke element 2, the side yoke elements 3, 3 and the permanent magnets 5, 5, except for the surfaces of the permanent magnets facing the center yoke.

Preferable thermoplastic resins for constituting the hold member 11 include known resins preferably having a high heat resistance, such as polyphenylene sulfide, polyamides, polyimides, polyamideimides, polyesters such as polybutylene terephthalate, etc. These resins preferably have a longitudinal modulus of preferably $10 \times 10^4$ kg/cm$^2$ or more (measured according to ASTM D-638), and more preferably $13 \times 10^4$ kg/cm$^2$ or more. Particularly preferable are liquid crystal polyesters including rigid chains in their principal chains, one of thermoplastic liquid crystal polymers (exhibiting a liquid crystal property when molten).

Such liquid crystal polyesters include (a) copolymers of parahydroxybenzoic acid and polyethylene terephthalate, (b) copolymers of poly-p-hydroxybenzoate and aromatic dicarboxylic acid or aromatic diol, (c) copolymers of poly-p-hydroxybenzoate and naphthoic acid, etc. From the viewpoint of strength and modulus, aromatic liquid crystal polyesters (b) and (c) are preferable, and (c) is more preferable. Particularly, since aromatic polyesters (c) have rigid molecular chains oriented in the flow direction in the molding process, they exhibit large longitudinal modulus in the direction. In addition, they exhibit good vibration absorbing properties and small linear expansion coefficient (near those of metals).

The liquid crystal polymers show high fluidity and so can be easily molded when heated at a liquid crystal temperature lower than a melting point. Particularly, liquid crystal polymers having longitudinal modulus (tensile modulus) of $16 \times 10^4$ kg/cm$^2$ or more are preferable. Specific examples of liquid crystal polymers include aromatic, thermotropic liquid crystal polyesters, such as Vectra A130 (longitudinal modulus: $18 \times 10^4$ kg/cm$^2$), C130 ($16 \times 10^4$ kg/cm$^2$), A230 ($30 \times 10^4$ kg/cm$^2$), B230 ($38 \times 10^4$ kg/cm$^2$), A410 ($21 \times 10^4$ kg/cm$^2$), A422 ($18 \times 10^4$ kg/cm$^2$), C400 ($17 \times 10^4$ kg/cm$^2$) and A540 ($16 \times 10^4$ kg/cm$^2$) each manufactured by Celanese; XYDAR RC-210 ($16.2 \times 10^4$ kg/cm$^2$) and G-43C ($16.1 \times 10^4$ kg/cm$^2$) manufactured by Dartco, etc.

Incidentally, the longitudinal modulus is $220 \times 10^4$ kg/cm$^2$ (steel), $68 \times 10^4$ kg/cm$^2$ (aluminum), $4.2 \times 10^4$ kg/cm$^2$ (methacrylic resins), 3.2–3.6×10⁴ kg/cm² (polystyrenes), and 10×10⁴ kg/cm² (polyphenylene sulfide). Accordingly, the above liquid crystal polymers have larger rigidities than general thermoplastic resins.

To increase the mechanical strength and the heat resistance of the hold member 11, glass fibers, carbon fibers, etc. may be added to these liquid crystal polymers. The amounts of such fillers may be 10–50 weight %, preferably 20–40 weight %.

Thermoplastic resins usable in the present invention have flexural modulus of 13×10⁴ kg/cm² or more (measured according to ASTM D-792). Such resins include, in addition to the above-mentioned resins, polyphenylene sulfide such as Ryton R-4 (14×10⁴ kg/cm²) manufactured by Phillips Petroleum; DIC-PPS FZ-1140 (14×10⁴ kg/cm²) manufactured by Dainippon Ink and Chemicals, ASAHI-PPS RG-40JA (14.4×10⁴ kg/cm²) manufactured by Asahi Glass; Fortron 1140A1 (13×10⁴ kg/cm²) manufactured by Polyplastics, GS-40 (15×10⁴ kg/cm²), G-10 (20×10⁴ kg/cm²), G-6 (18×10⁴ kg/cm²), G-4F (14×10⁴ kg/cm²) and FC-5 (16×10⁴ kg/cm²) manufactured by Tosoh Susteel, etc.

The integral structure of the actuator may be fabricated by an injection molding called "insert molding." In the insert molding, the base yoke element 1, the center yoke element 2, the side yoke elements 3, 3 and the permanent magnets 5, 5 are placed in a cavity of an injection molding die, and a molten resin such as polyphenylene sulfide containing glass fibers is injected into the cavity to provide a molded article with a hold member 11 integrally enclosing the elements.

The permanent magnets 5, 5 are flat plates magnetized in the thickness direction and assembled with the same magnetic poles opposing each other. Since thicker permanent magnets 5, 5 lead to a smaller magnetic gap, the permanent magnets 5, 5 are desirably as thin as possible. Accordingly, the permanent magnets 5, 5 are preferably made of magnet materials such as rare earth magnet materials showing a large coercive force. In particular, in order to satisfy more strict needs for thinner actuators with high performance, the permanent magnets 5, 5 are more preferably made of R-Fe-B alloys (R is one or more of rare earth elements such as Nd, Pr, Dy, etc.).

Though the permanent magnets 5, 5 need only be enclosed by the hold member 11 in their side surfaces in order for the magnets to be retained or held in the assembly, the hold member 11 may further extend to enclose the most surfaces of the permanent magnets 5, 5.

Though the hold member 11 is preferably continuous, it may be discontinuous or may be constituted by a plurality of projections, provided that they can firmly hold the elements. Magnetization of the permanent magnets 5, 5 may be deferred until they are assembled to the side yoke elements 5, 5. The first embodiment may be applied to a structure in which a movable coil moves straight along the center yoke element 2.

[2] Second Embodiment

Figure 3:
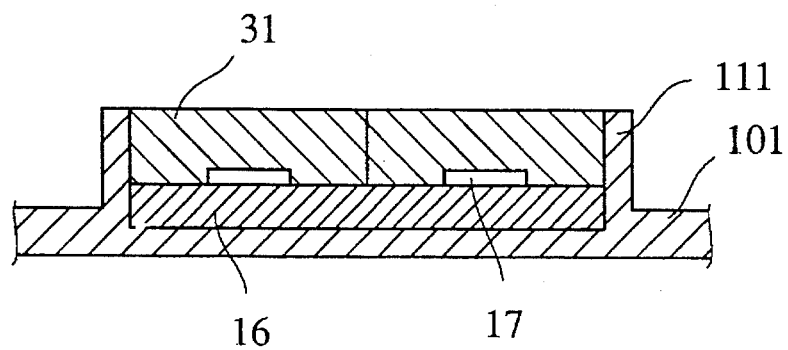
FIG. 3 is a cross-sectional view taken along the line A—A in FIG. 2.
Figure 2:
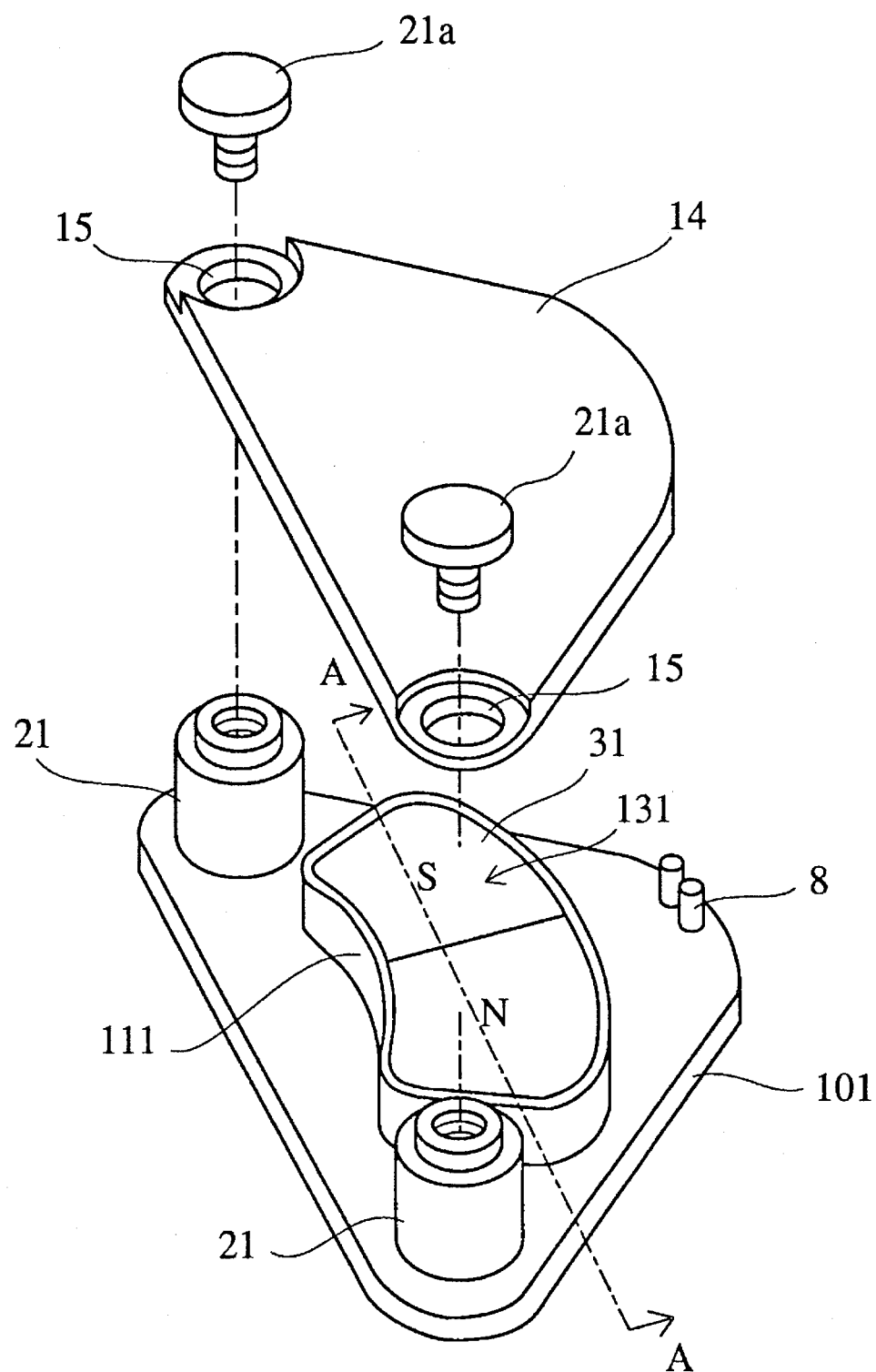
FIG. 2 is an exploded perspective view of a movable coil-type actuator according to a second embodiment of the present invention.

FIGS. 2 and 3 show a movable coil-type actuator in the second embodiment of the present invention. The movable coil-type actuator includes a base member 101 which is a unitary member having supports 21, 21, stoppers 8, 8, and a hold portion 111 for holding a permanent magnet assembly 131 on a surface thereof. To make the integral structure of the base member 101 having the permanent magnet assembly 131, an insert molding may be employed. In the insert molding, the permanent magnet assembly 131 is placed in a cavity of an injection molding die, and a molten resin such as polyphenylene sulfide containing glass fibers is injected into the cavity to produce a molded product integrally containing the permanent magnet assembly 131 in the hold portion 111.

The permanent magnet assembly 131 includes a permanent magnet 31 and a lower yoke element 16 attached to the bottom of the permanent magnet 31. The permanent magnet 31 is a fan-shaped flat plate made of, for example, an Nd-Fe-B magnetic alloy. It is magnetized in the thickness direction such that different magnetic poles, N and S magnetic poles, appear on the same surface. The permanent magnet 31 may be constituted by either a single member or two separate permanent magnet members bonded together as shown in the FIGS. 2 and 3. The lower yoke element 16 is a flat plate having the same contour as that of the permanent magnet 31 and made of a ferromagnetic material such as soft iron. Provided along the boundary between the permanent magnets 31, 31 and the lower yoke element 16 are recesses 17 formed in either the permanent magnets 31, 31 (as shown in FIG. 3) or the lower yoke element 16 or both so as to have a space between them. The lower yoke element 16 may be attached to the bottom of the permanent magnet 31 with a magnetic attraction force to make up the permanent magnet assembly 131.

Mounted to the base member 101 is an upper yoke 14 which is a rounded triangular flat plate made of the same ferromagnetic material as that of the lower yoke element 16 and having bores 15, 15 in opposite end portions. The upper yoke element 14 has a shape that encompasses the entirety of the permanent magnet 31.

The movable coil-type actuator shown in FIGS. 2 can be readily assembled by threadingly inserting screws 21a, 21a into the supports 21, 21 of the base member 101 via bores 15, 15 of the upper yoke element 14. The upper yoke element 14 has such a shape that the permanent magnet 31 integrally encompassed by the hold portion 111 does not extend from a periphery of the upper yoke element 14 when viewed from above.

The space defined by the recess 17 in a lower surface of each permanent magnet 31 and/or in an upper surface of the lower yoke element 16 functions to increase a magnetic resistance between the permanent magnet 31 and the lower yoke element 16, thus decrease a magnetic flux density. On the other hand, since a magnetic resistance is relatively small between the lower yoke element 16 and the edge of the permanent magnet 31, magnetic flux leaking from the permanent magnet 31 at the edge thereof and part of the magnetic flux generating from the permanent magnet 31 at the center thereof are attracted to the edge area the permanent magnet assembly 131. As a result, the movable coil-type actuator of this embodiment exhibits a uniform magnetic flux density in a magnetic gap, thereby making it possible to avoid the tendency of conventional movable coil-type actuators that a magnetic flux density is maximized near the center of the permanent magnet and decreases toward the ends of the permanent magnet.

[3] Third Embodiment

Figure 4:
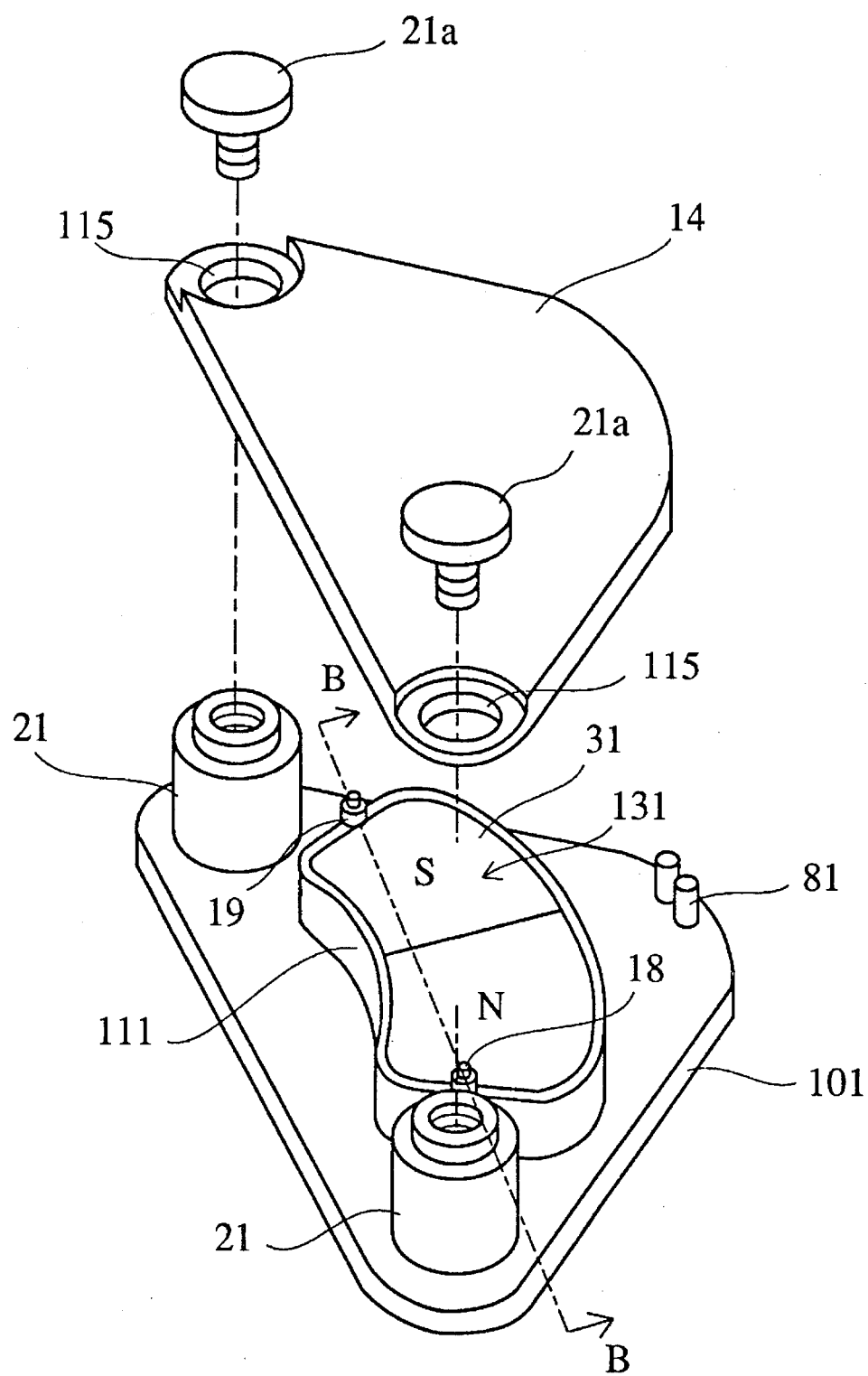
FIG. 4 is an exploded perspective view of a movable coil-type actuator according to a third embodiment of the present invention.
Figure 5:
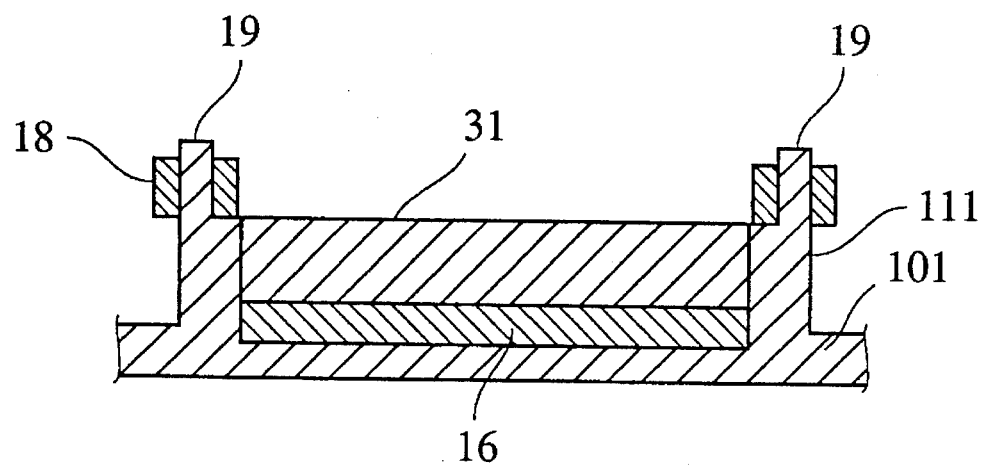
FIG. 5 is a cross-sectional view taken along the line B—B in FIG. 4.

A movable coil-type actuator in the third embodiment of the present invention is shown in FIGS. 4 and 5. The movable coil-type actuator includes a base member 101 which is a unitary member from which supports 21, 21, stoppers 81, 81, and a hold portion 111 for holding a permanent magnet assembly 131 extend vertically. The hold portion 111 includes stopper pins 19, 19 extending vertically from the upper end thereof at opposite end positions. The integral structure of the base member 101 having the permanent magnet assembly 131 in the hold portion 111 may be fabricated by the same method as in the second embodiment.

The permanent magnet assembly 131 includes a permanent magnet 31 and a lower yoke element 16 attached to the bottom of the permanent magnet 31. The permanent magnet 31 may be the same as in the second embodiment. The lower yoke element 16 is a flat plate having the same contour as that of the permanent magnet 31 and made of a ferromagnetic material such as soft iron. The lower yoke element 16 may be attached to the bottom of the permanent magnet 31 with a magnetic attraction force to make up the permanent magnet assembly 131.

Mounted to the base member 101 is an upper yoke 14 which may be the same as in the second embodiment.

The movable coil-type actuator shown in FIGS. 4 and 5 can be readily assembled by mounting stopper rings 18, 18 made of rubber or other resilient materials to the stopper pins 19, 19, putting the upper yoke element 14 on the supports 21, 21 of the base member 101 having the permanent magnet assembly 131 integrally encompassed by the hold portion 111, and then applying screws 21a, 21a to the supports 21, 21 via bores 115, 115 of the upper yoke element 14.

The permanent magnet 31 used in the second and third embodiments may be made of the same material as in the first embodiment. Preferable resins for molding the base members 101 in the second and third embodiments may be the same as those mentioned in the first embodiment with reference to the hold member 11.

The hold portion 111 in the second and third embodiments may have a continuous circular wall. However, it may be constituted by a plurality of separate projections, provided that they can firmly hold the periphery of the permanent magnet assembly 131. The permanent magnet assembly 131 may be press-fitted into the hold portion 111 after the base member 101 including the hold portion 111 is molded, in lieu of inserting the permanent magnet assembly 131 in the molding die.

The fixing of the upper yoke element 14 to the supports 21, 21 may be achieved by striking or press-fitting rivets in lieu of applying screws 21a, 21a.

[3] Fourth Embodiment

Figure 7:
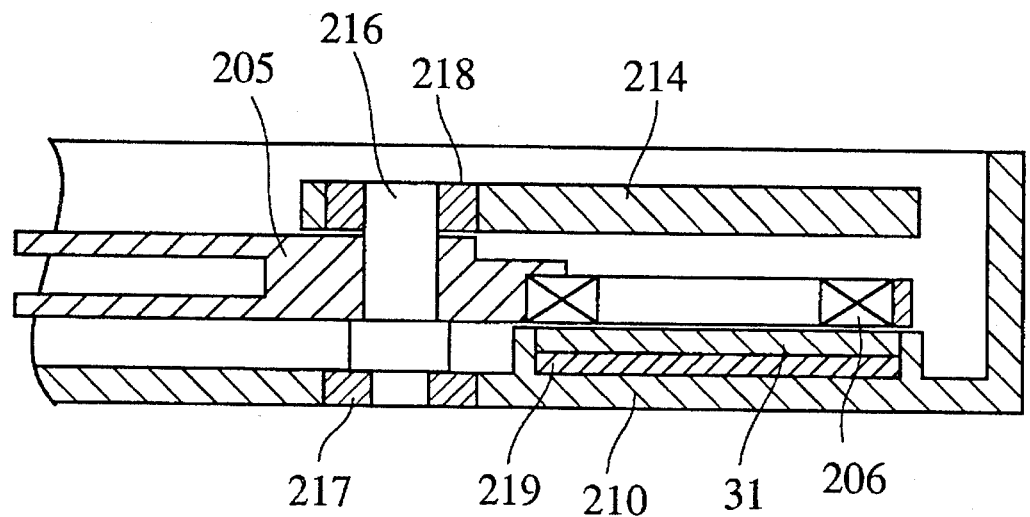
FIG. 7 is a partial cross-sectional view of the magnetic disk drive of FIG. 6.
Figure 6:
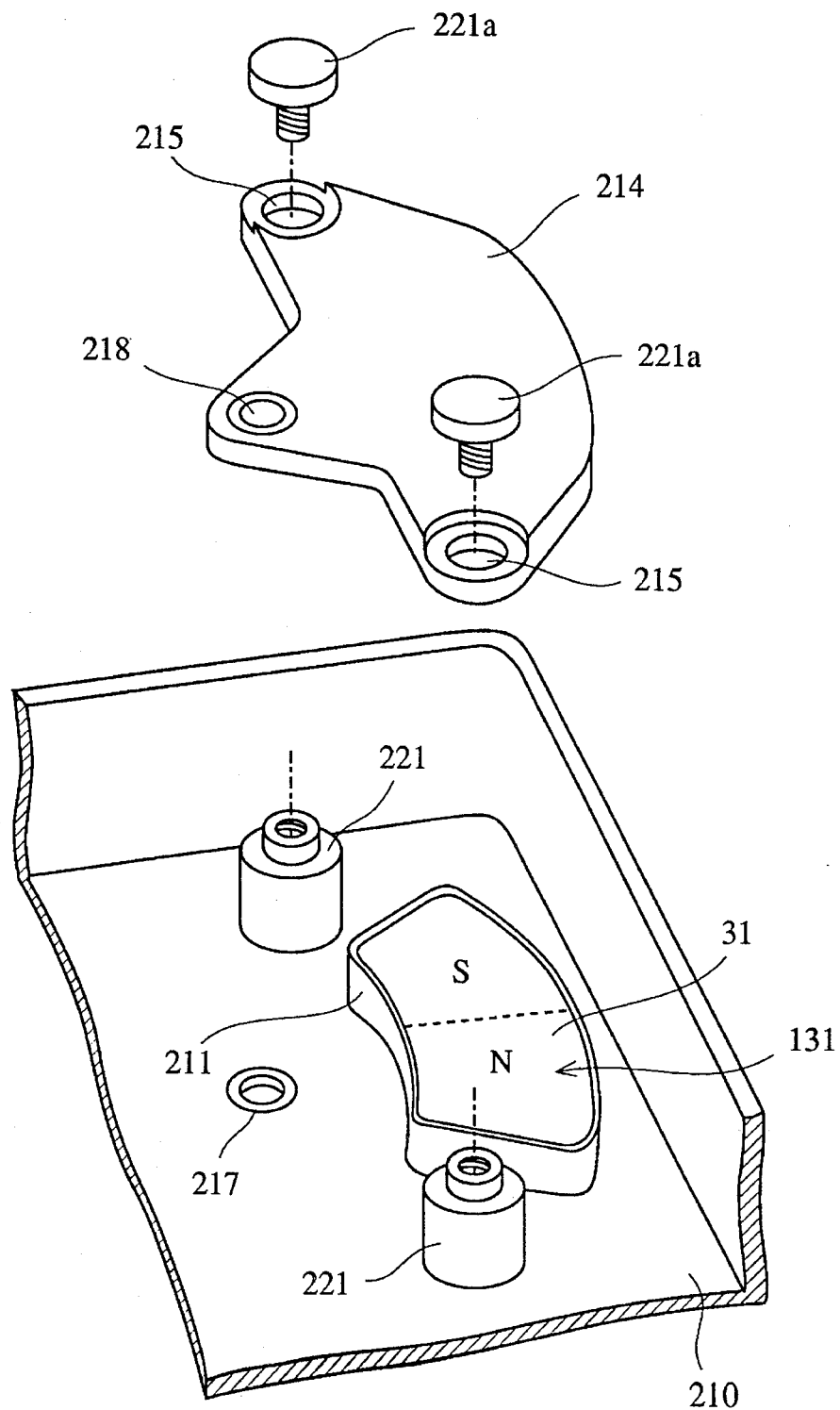
FIG. 6 is a partly broken, exploded perspective view of a magnetic disk drive according to a fourth embodiment of the present invention.
Figure 8:
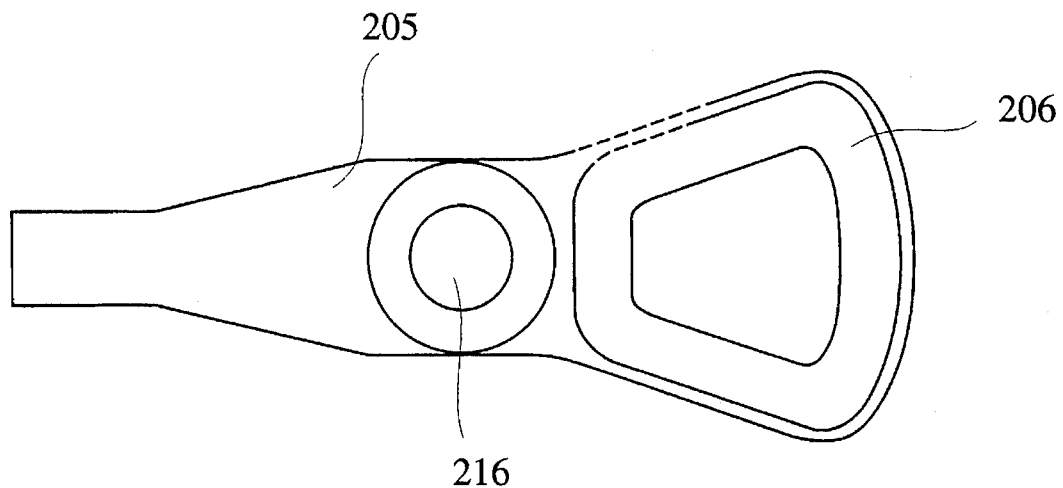
FIG. 8 is a partly cross-sectional plan view of an arm contained in the magnetic disk drive of FIG. 6.
Figure 13:
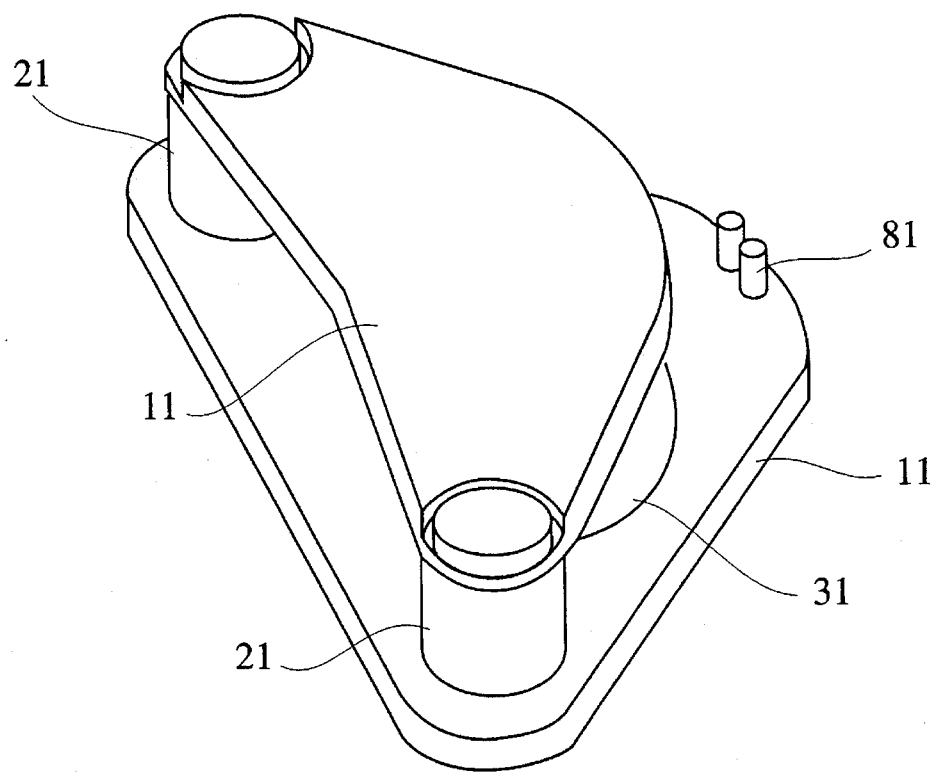
FIG. 13 is a perspective view of the conventional actuator of FIG. 12($a$)
Figure 9:
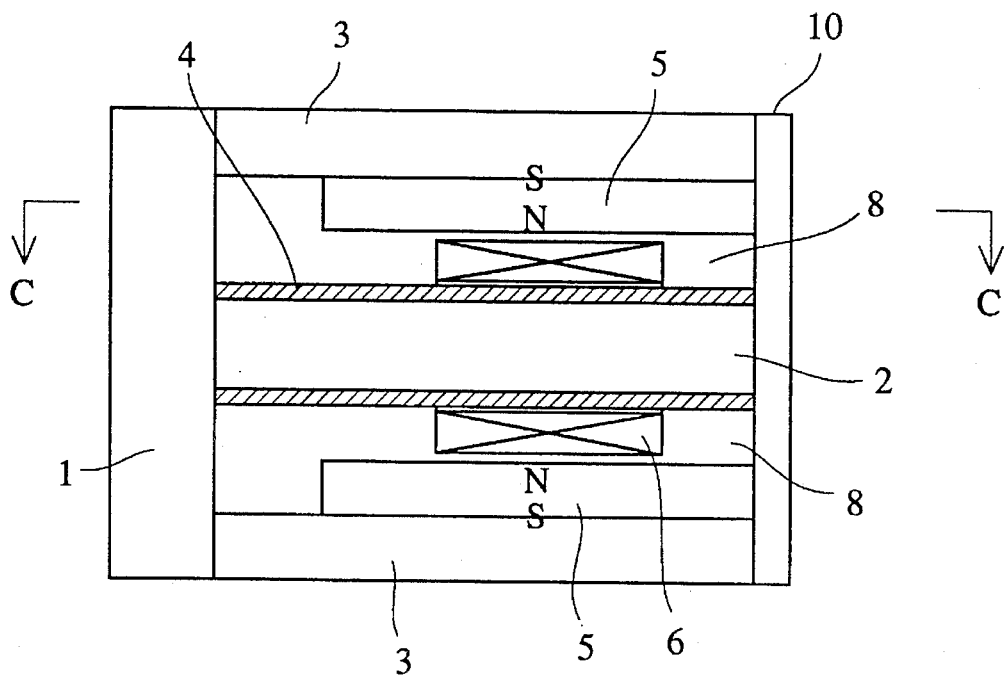
FIG. 9 is a partly cross-sectional front elevation of a conventional movable coil-type actuator.
Figure 10:
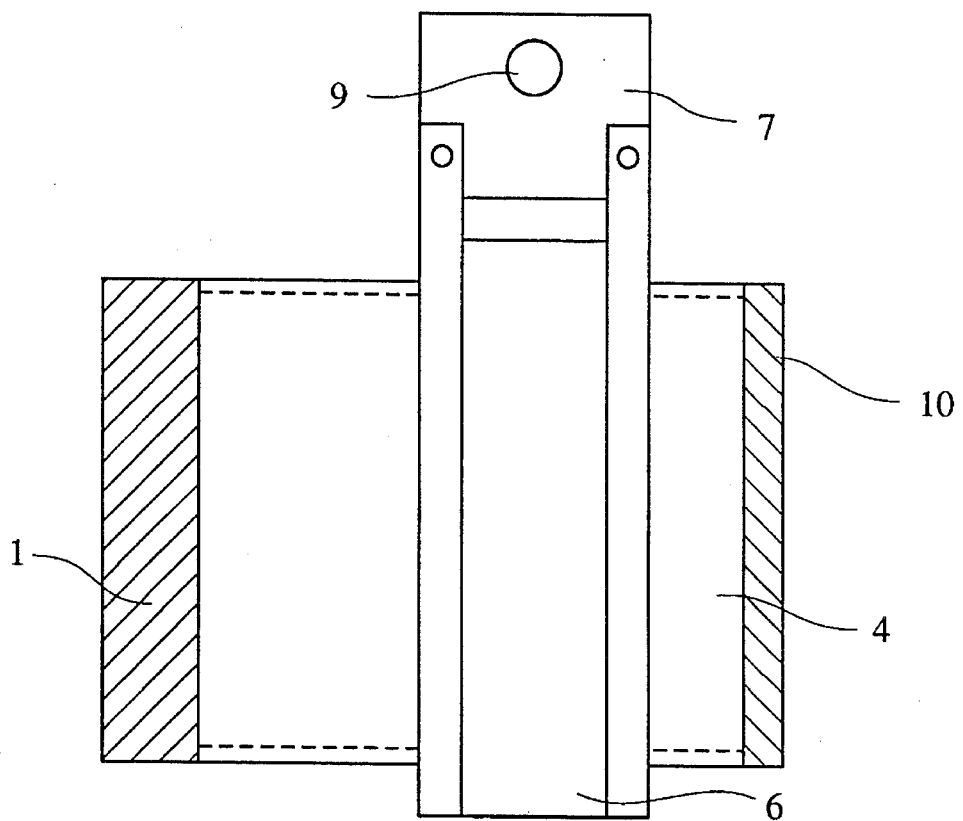
FIG. 10 is a cross-sectional view taken along the line C—C in FIG. 9.
Figure 11:
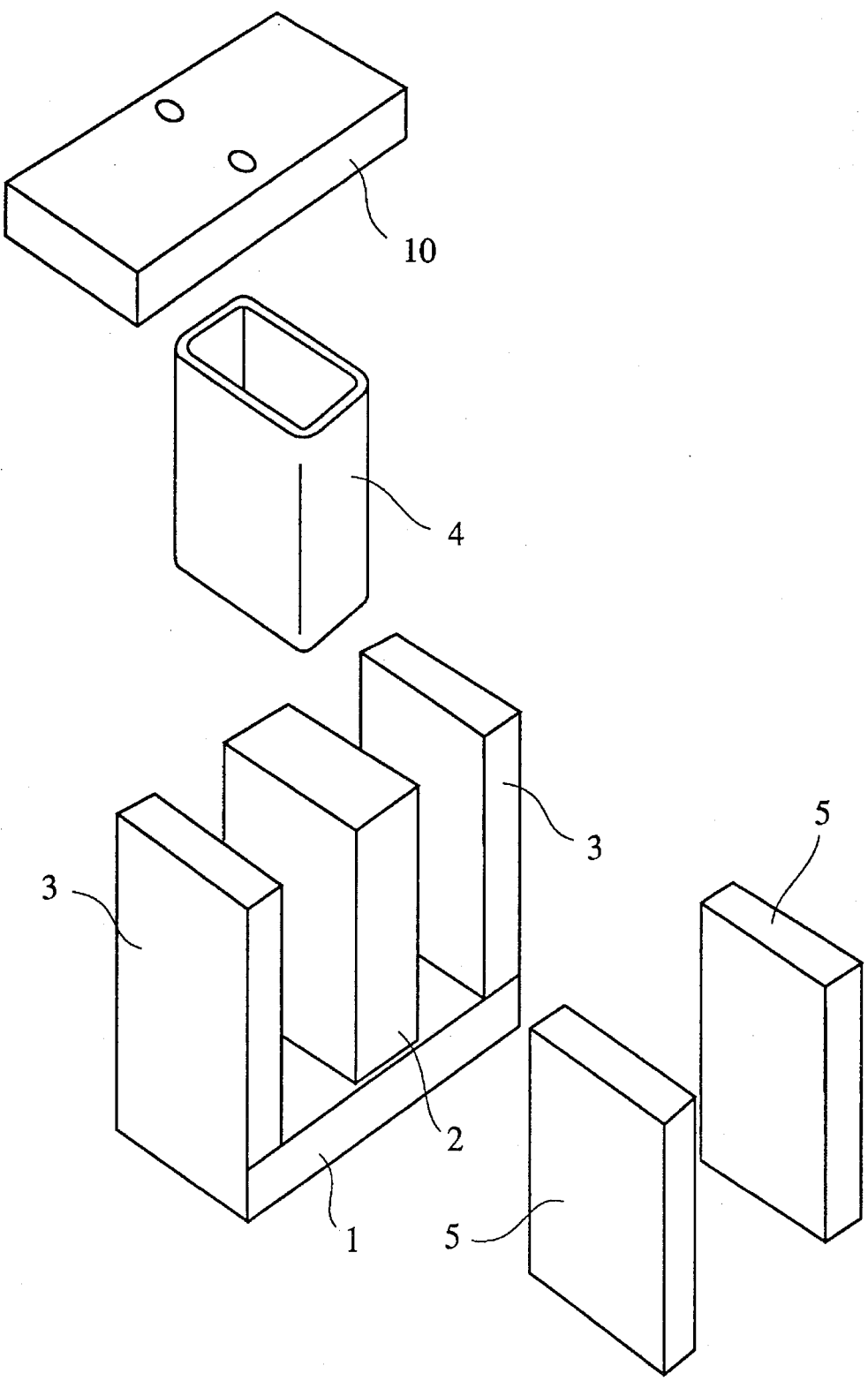
FIG. 11 is an exploded perspective view of the actuator shown in FIGS. 9 and 10.
Figure 14:
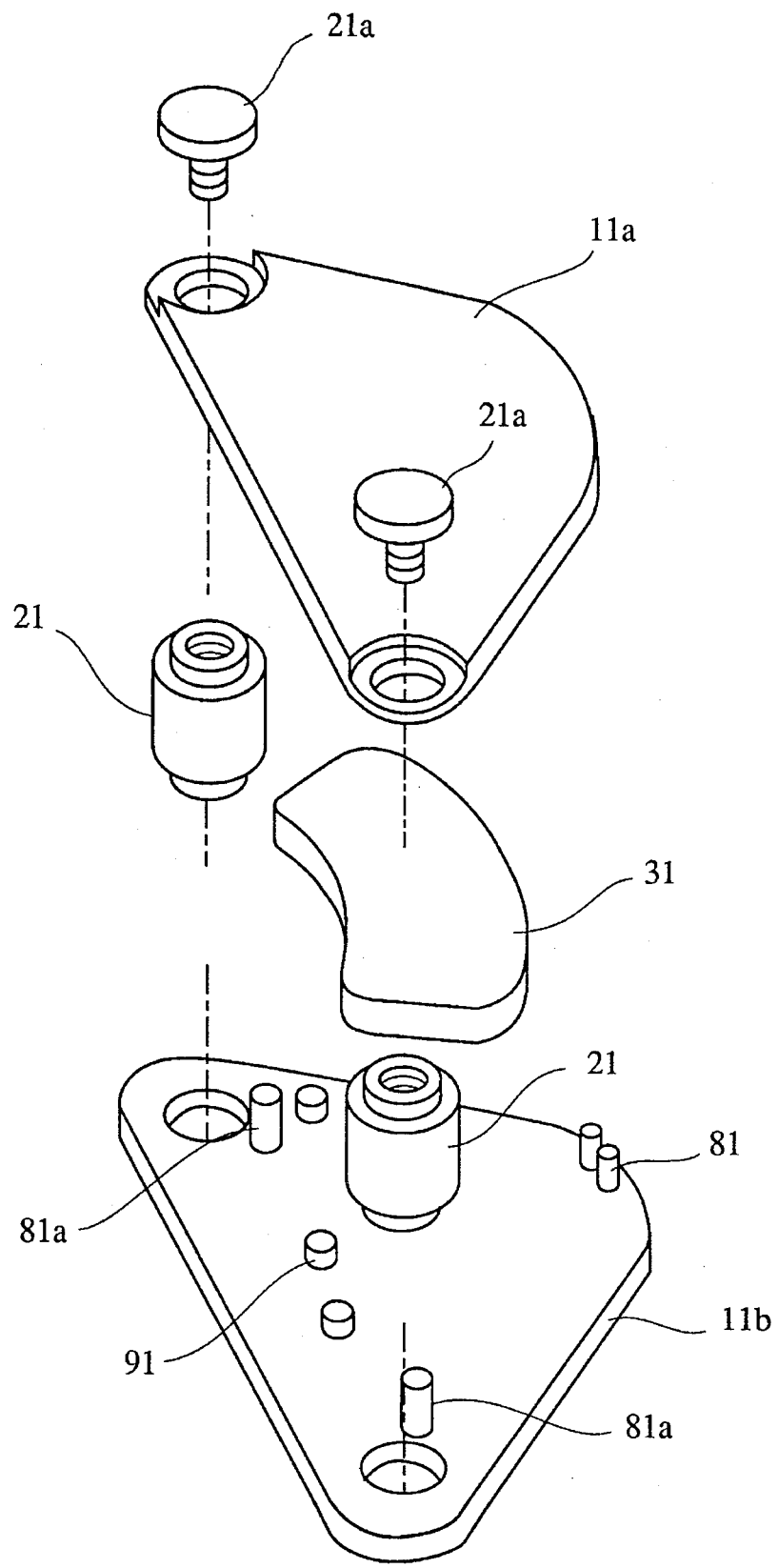
FIG. 14 is an exploded perspective view of the conventional actuator of FIG. 12($a$)
Figure 15:
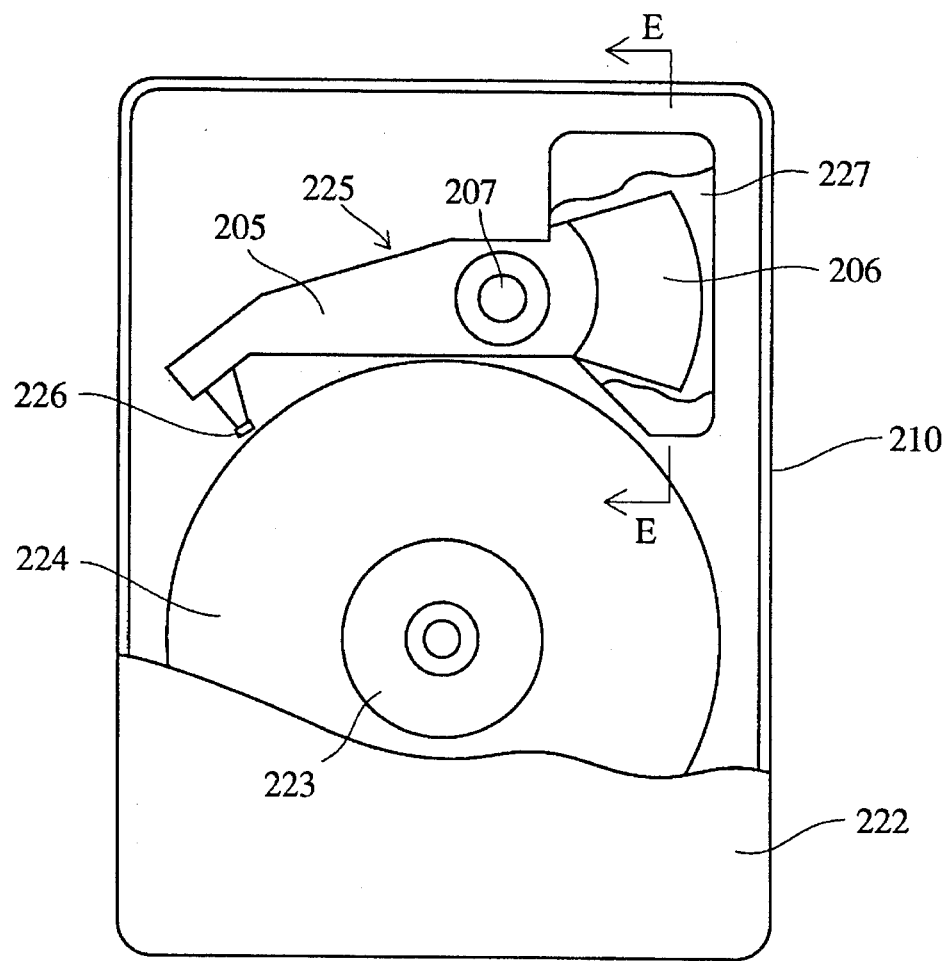
FIG. 15 is a partly cut-away plan view of a conventional magnetic disk drive.
Figure 16:
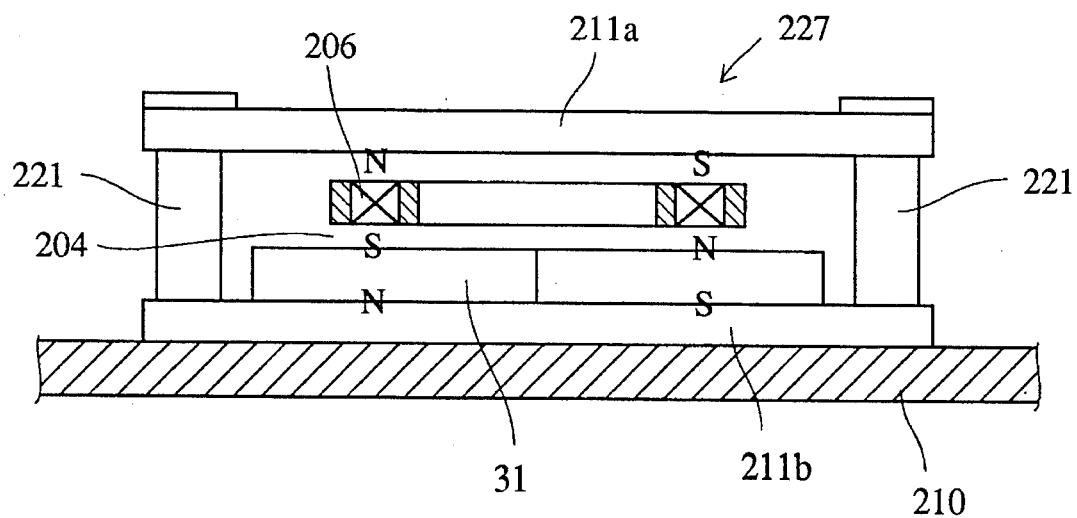
FIG. 16 is a partial cross-sectional view taken along the line E—E in FIG. 15.
Figure 17:
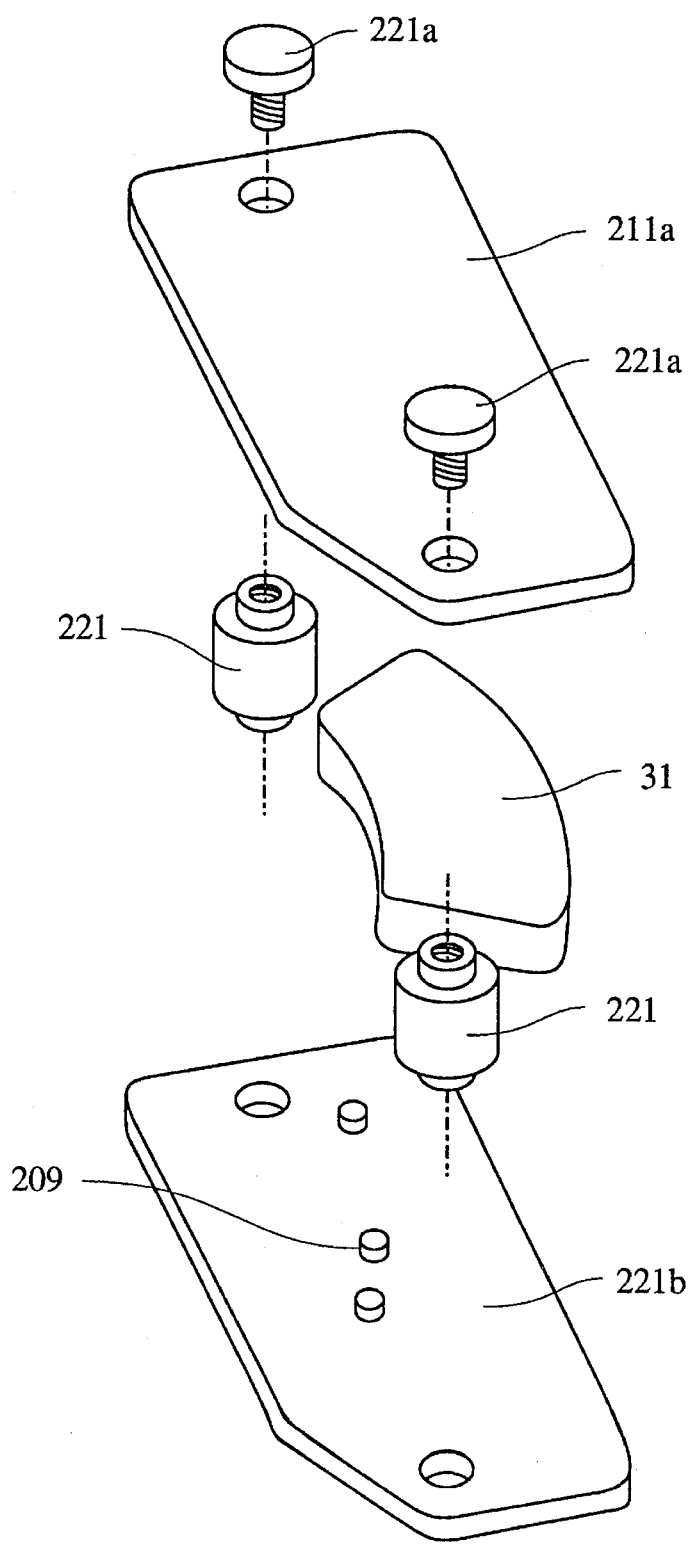
FIG. 17 is an exploded perspective view of the conventional magnetic disk drive of FIG. 15.

In this embodiment, a magnetic disk drive is shown as an example of a recording apparatus in FIGS. 6–8. A rectangular casing 210 is a unitary member from which supports 221, 221 and a hold portion 211 for holding a permanent magnet assembly 131 integrally project vertically. The rectangular casing 210 also has a bearing 217 for rotatably supporting a shaft 216 fixed to an arm 205.

The integral structure of the rectangular casing 210 may be fabricated by an insert molding method as in the above embodiments. In the insert molding, the permanent magnet assembly 131 is placed in a cavity of an injection molding die, and a molten resin such as polyphenylene sulfide containing glass fibers is injected into the cavity to produce a molded product integrally containing the permanent magnet assembly 131 in the hold portion 211 of the rectangular casing 210. The bearing 217 can be fixed to the rectangular casing 210 by inserting the bearing 217 into the die cavity at a predetermined position in advance and then injecting a molten resin thereinto.

The permanent magnet assembly 131 includes a permanent magnet 31 and a lower yoke element 219 attached to the bottom of the permanent magnet 31. The permanent magnet 31 in the form of a fan-shaped flat plate made of, for example, an Nd-Fe-B magnetic alloy is magnetized in the thickness direction such that different magnetic poles, N and S magnetic poles, appear on the same surface. The permanent magnet 31 may be constituted by either a single member or two separate permanent magnet members bonded together. The lower yoke element 219 is a flat plate having the same contour as that of the permanent magnet 31 and made of a ferromagnetic material such as soft iron. The lower yoke element 219 may be attached to the bottom of the permanent magnet 31 with a magnetic attraction force to make up the permanent magnet assembly 131.

Mounted to the rectangular casing 210 is an upper yoke 214 which is a fan-shaped flat plate made of the same ferromagnetic material as that of the lower yoke element 219 and having bores 215, 215, 218. The upper yoke element 214 has a shape that encompasses the entirety of the permanent magnet 31. Accordingly, the permanent magnet 31 does not extend from a periphery of the upper yoke element 214 when viewed from above.

The magnetic circuit-forming means shown in FIGS. 6–8 can be readily assembled by inserting the shaft 216 fixed to the arm 205 into the bearing 217 embedded in the rectangular casing 210, inserting the shaft 216 into the bore 218 of the upper yoke element 214, threadingly inserting screws 221a, 221a into the supports 221, 221 of the rectangular casing 210 via the bores 215, 215 of the upper yoke element 214. In place of the screws 221a, rivets or press-fitting may be used.

The hold member 211 may be discontinuous or may be constituted by a plurality of projections, provided that they can firmly hold the permanent magnet assembly 131.

In any of the first to fourth embodiments, the arm may support at the other end thereof a function member such as an optical head instead of the magnetic head referred to above.

With a unitary structure integrally enclosing most part of elements, the movable coil-type actuator and the magnetic disk drive of the present invention can be constituted by a significantly decreased number of parts, and the alleviation of assembling labor and a significant decrease in manufacturing cost can be achieved. The use of the unitary structure also contributes to realization of more miniaturized, thinner actuators, and can omit an adhesive which otherwise would have to be used to assemble the permanent magnet.

Although the present invention has been explained separately with respect to each embodiment, it should be noted that two or more features as described above may be incorporated into the movable coil-type actuator and the recording apparatus of the present invention without departing from the scope and spirits of the present invention.

What is claimed is:

1. A movable coil-type actuator comprising:
 (a) a permanent magnet assembly constituted by a flat permanent magnet and a lower yoke element, wherein said flat permanent magnet is magnetized in its thickness direction and has upper and lower surfaces and a periphery, and wherein said lower yoke element is ferromagnetic and abuts said lower surface of said flat permanent magnet;
 (b) an upper yoke element made of a ferromagnetic material and shaped so that an edge of said flat permanent magnet does not extend beyond a periphery of said upper yoke element when viewed from above;
 (c) a unitary base member made of a thermoplastic resin, said unitary base member having an upper surface including a hold portion integrally molded with and projecting from said upper surface of said base member for enclosing said flat permanent magnet at said periphery, said hold portion being substantially coextensive with said thickness of said permanent magnet assembly;

(d) support portions integrally molded with and projecting from said upper surface of said base member for supporting said upper yoke element;

(e) a magnetic gap being defined between said flat permanent magnet and said upper yoke element; and (f) a movable coil fixed to an end of a swingable arm and being movable in said magnetic gap;

wherein said permanent magnet assembly is integrally retained by said hold portion said lower yoke element is held against said flat permanent magnet, and said upper surface of said flat permanent magnet is exposed in said magnetic gap.

2. A movable coil-type actuator comprising:

(a) a permanent magnet assembly constituted by a flat permanent magnet and a lower yoke element, wherein said flat permanent magnet is magnetized it its thickness direction and has upper and lower surfaces and a periphery, and wherein said lower yoke element is ferromagnetic and abuts said lower surface of said flat permanent magnet;

(b) an upper yoke element made of a ferromagnetic material and shaped so that an edge of said flat permanent magnet does not extend beyond a periphery of said upper yoke element when viewed from above;

(c) a unitary base member made of thermoplastic resin, said unitary base member having an upper surface including a hold portion integrally molded with and projecting from said upper surface of said base member for enclosing said flat permanent magnet at said periphery, said hold portion being substantially coextensive with said thickness of said permanent magnet assembly;

(d) stopper portions integrally molded with and projecting from said hold portion;

(e) support portions integrally molded with and projecting from said upper surface of said unitary base member for holding said upper yoke element in fixed relation to said unitary base member;

(f) a magnetic gap being defined between said flat permanent magnet and said upper yoke element;

(g) stopper rings made of an elastic material and attached to said stopper portions; and (h) a movable coil fixed to an end of a swingable arm and being movable in said magnetic gap between said stopper portions;

wherein said permanent magnet assembly is integrally retained by said hold portion, said lower element is held against said flat permanent magnet, and said upper surface of said flat permanent magnet is exposed in said magnetic gap.

3. A recording apparatus comprising:

(a) a permanent magnet assembly constituted by a flat permanent magnet and a lower yoke element, wherein said flat permanent magnet is magnetized it its thickness direction and has upper and lower surfaces and a periphery, and wherein said lower yoke element is ferromagnetic and abuts said lower surface of said flat permanent magnet;

(b) an upper yoke element made of a ferromagnetic material and shaped so that an edge of said flat permanent magnet does not extend beyond a periphery of said upper yoke element when viewed from above;

(c) a casing made of a thermoplastic resin, said casing having a bottom surface including a hold portion integrally molded with and projecting from said bottom surface of said casing for enclosing said flat permanent magnet at said periphery, said hold portion being substantially coextensive with said thickness of said permanent magnet assembly;

(d) support portions integrally molded with and projecting from said bottom surface of said casing near said holding portion for holding said upper yoke element in fixed relation to said casing;

(e) a magnetic gap being defined between said flat permanent magnet and said upper yoke element;

(f) a recording medium rotatable by a motor supported by said casing; and (g) a swingable arm having a movable coil at an end thereof, said movable coil being movable in said magnetic gap;

wherein said permanent magnet assembly is integrally retained by said hold portion, said lower yoke element is held against said flat permanent magnet, and said upper surface of said flat permanent magnet is exposed in said magnetic gap.

* * * * *